United States Patent
Rahn et al.

(10) Patent No.: US 11,178,249 B2
(45) Date of Patent: Nov. 16, 2021

(54) DEVICE PROVISIONING IN A MULTI-TENANT SERVICE

(71) Applicant: Arista Networks, Inc., Santa Clara, CA (US)

(72) Inventors: Ethan Rahn, Agoura Hills, CA (US); Andre Pech, San Francisco, CA (US); Aaron Delaney, Dublin (IE); Roy Magruder, Atherton, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 16/824,381

(22) Filed: Mar. 19, 2020

(65) Prior Publication Data

US 2021/0297503 A1 Sep. 23, 2021

(51) Int. Cl.
| | | |
|---|---|---|
| *H04L 29/08* | (2006.01) | |
| *G06F 9/455* | (2018.01) | |
| *G06F 16/953* | (2019.01) | |
| *G06F 9/54* | (2006.01) | |
| *G06Q 30/06* | (2012.01) | |

(Continued)

(52) U.S. Cl.
CPC .......... *H04L 67/32* (2013.01); *G06F 9/45558* (2013.01); *G06F 9/547* (2013.01); *G06F 16/953* (2019.01); *G06Q 30/00* (2013.01); *G06Q 30/0633* (2013.01); *G06Q 30/0635* (2013.01); *G06Q 30/0637* (2013.01); *H04L 41/5096* (2013.01); *G06F 2009/4557* (2013.01); *H04L 67/10* (2013.01)

(58) Field of Classification Search
CPC ..... H04L 67/32; H04L 41/5096; H04L 67/10; G06Q 30/0635; G06Q 30/00; G06Q 30/0637; G06Q 30/0633; G06F 16/953; G06F 9/547; G06F 9/45558; G06F 2009/4557

See application file for complete search history.

(56) References Cited

U.S. PATENT DOCUMENTS 9,501,801 B2 * 11/2016 Wong ..................... G06Q 10/06
9,953,143 B2 *  4/2018 Yee ...................... G06Q 30/018

(Continued)

OTHER PUBLICATIONS

U.S. Appl. No. 16/824,380, filed Mar. 19, 2020, Ethan Rahn.
U.S. Appl. No. 16/824,382, filed Mar. 19, 2020, Ethan Rahn.

*Primary Examiner* — Michael A Keller
(74) *Attorney, Agent, or Firm* — Fountainhead Law Group P.C.

(57) ABSTRACT

A method for distributing network services for a network device through a multi-tenant network service. An identification parameter is associated with the device and is stored in a database by an orders management system after the device is ordered. The method includes establishing a network connection between a network device and a multi-tenant network service and, in response to establishing the network connection, obtaining device-associated identification parameter from the network device. The identification parameter is used to query the database for at least one record associated with the network device identifying a tenant of the multi-tenant network service in which the tenant corresponds to the device. The service maps the network device to the identified tenant of the multi-tenant network service and distributes network services based upon the mapping of the network device to the identified tenant.

27 Claims, 6 Drawing Sheets

(51) Int. Cl.
*G06Q 30/00* (2012.01)
*H04L 12/24* (2006.01)

(56) References Cited

U.S. PATENT DOCUMENTS

| | | | | |
|---|---|---|---|---|
| 2004/0019564 | A1* | 1/2004 | Goldthwaite | G06Q 20/12 |
| | | | | 705/44 |
| 2007/0010311 | A1* | 1/2007 | Irwin, Jr. | A63F 3/064 |
| | | | | 463/17 |
| 2013/0211874 | A1* | 8/2013 | Wu | G06Q 30/0203 |
| | | | | 705/7.29 |
| 2019/0163597 | A1* | 5/2019 | Shibamura | G06Q 10/20 |
| 2019/0379612 | A1* | 12/2019 | Tiwary | H04L 47/76 |
| 2020/0162318 | A1* | 5/2020 | Patil | G06F 9/4401 |

* cited by examiner

DEVICE PROVISIONING IN A MULTI-TENANT SERVICE

BACKGROUND

The present disclosure relates to automatically identifying and connecting devices to multi-tenant services across a computer network. In some computer networks, network devices (e.g., switches, routers, etc.) are procured and purposed for use with particular network services provided by a remote multi-tenant network service (e.g., a virtualized data cloud service, provisioning service, network management service, etc.). A multi-tenant service typically services numerous tenants associated with numerous respective devices. Different tenants may utilize and/or may have purchased different configurations, network management, software, or virtualized data storage services for use with particular devices. When distributing network services, the service must thus identify the particular tenant associated with the device (e.g., how to rout network traffic for a particular switch of a particular tenant). Setup and updating of such devices are generally performed through a visual inspection of the device and use of a printed identification (e.g., a printed serial number) located on the device cover. The identification may be manually read and disseminated to the manufacturer or service provider such as by an onsite technician. Manually identifying and/or registering the device for purposes of configuration and establishing services can be a time consuming and inconvenient process, especially if there are a large number of network devices involved. In addition, these printed identifications can be readily duplicated and/or shared with users of counterfeit devices, in which case the user and/or service provider may be unaware of the device's unauthenticity. Users of such network devices would benefit from a more seamless setup and distribution of network services.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are described herein to address these problems and to provide more efficient and secure provisioning and distribution of network services for use with particular network devices. In some approaches, once a multi-tenant cloud-based service and portal is connected to a device through a network (e.g., the Internet), services, configurations, and software are directly distributed by automatically identifying the tenant corresponding to the device. A process for such seamless distribution is facilitated at the time the device is purchased or acquired by updating a database connected to the service based upon details of the purchase/acquisition. In some approaches, these details include a unique identification number (e.g., serial number) and a tenant (e.g., purchaser/owner) associated with the device. The unique identification of the device is stored within memory of the device from where it is obtained and transmitted to the service upon establishing a connection, after which the service uses that identification and database to distribute/route services tailored to the device and tenant (e.g., software to be installed, configuration settings, and related products and services purchased by the tenant for use with the purchased device).

In some approaches, the device includes an extensible operating system for management and execution of certain device functions and also includes an internal memory within which the identification information of the device is stored. In some approaches, when a device is started, the device automatically connects through a network with the multi-tenant service/portal and transmits the identification information of the device to a server operating the service. After receiving the identification information of the device, the service may access a database (as previously described) to retrieve information about the purchaser and use the information to determine which tenant within the multi-tenant service should be associated with the device.

After identifying the device and associated tenant, the multi-tenant service then distributes services to the device based upon the device/tenant pairing. These services may include network device provisioning, configuration/software updates, virtualized data cloud services, network management services, network monitoring services, network workload distribution services, physical-to-virtual mapping services, hypervisor services, and open source controller services. A tenant account holder may configure/manage these services or add services through an interface (e.g., web-based interface) and an account management system provided by the multi-tenant service. In some embodiments, an application programming interface (API) is provided for a tenant to configure network settings and call services provided by the multi-tenant service.

The multi-tenant service can update corresponding database entries and records in a product/tenant database (e.g., where an orders management server generates/updates records) based upon the tenant's preferences and profile so that the routing and services provided by the multi-tenant service to the device are provided and processed accordingly. Periodic software and configuration updates to the device may also be processed automatically based upon the device/tenant pairing.

In some approaches, the multi-tenant service may authenticate the device using a unique identification associated with the device and a secure remote attestation protocol such as described in the related patent application, herein incorporated by reference.

Figure 1:
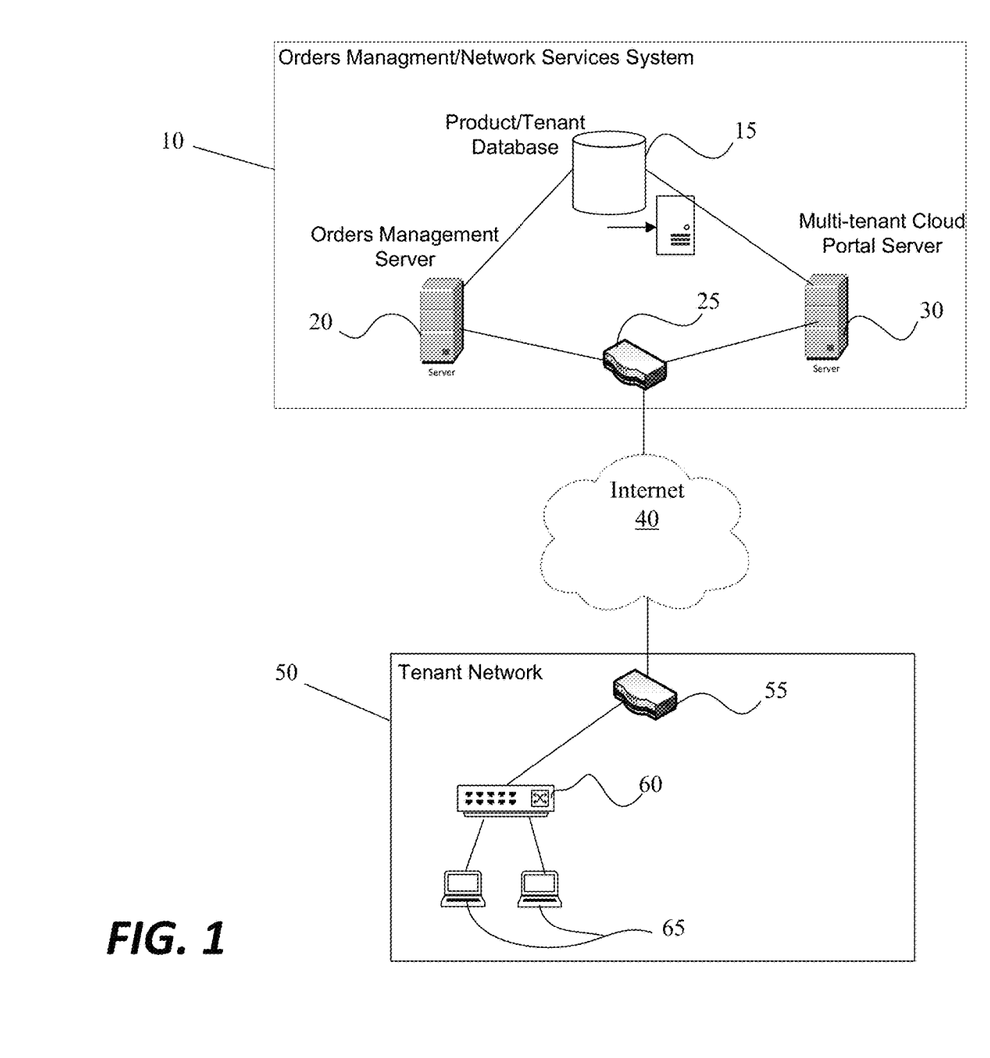
FIG. 1 shows an illustrative network topology of a system for distributing network services to a network device in accordance with some embodiments of the disclosure.

FIG. 1 shows an illustrative network topology of a system for distributing network services to a network device in accordance with some embodiments of the disclosure. An orders management/network services system 10 is arranged and configured to process purchase orders and product procurement of network of network devices (e.g., switches, routers, hubs) and network services (e.g., provisioning, configuring, network management/monitoring services, cloud services, network workload distribution services, physical-to-virtual mapping services, hypervisor services, and open source controller services, etc.).

An orders management server 20 is configured to receive purchase orders for network devices (e.g., a network device 60) from a purchaser/tenant. In response to receiving the purchase order, the orders management system stores records of data (e.g., a device serial number) correlating the device and corresponding purchaser/tenant in a product/tenant database 15. A multi-tenant cloud portal server 30 is configured to provide network services and is also connected to the product/tenant database 15. A router 25 connects purchasing/provisioning system 10 to the internet 40.

A tenant network 50 is connected to purchasing/provisioning system 10 via router 55 and internet 40. After a purchase/procurement of device 60 is processed through orders management server 20 and database 15, device 60 may be deployed in network 50 and connected to various other devices 65 within network 50 and to multi-tenant cloud portal server 30 via the internet 40. Once connected to cloud portal server 30, portal server 30 may identify device 60 by receiving a communication from device 60 including its unique identification parameter (e.g., a serial number) that was previously stored in database 15. In some embodiments, server 30 may initiate an authentication process for device 60 based upon the communicated identification parameter. The authentication process may include encryption protocols or other security measures such as further described herein.

Using information stored in database 15, server 30 may then correlate the device identification parameter with a particular tenant, particular software, configurations, and/or services associated with the device and/or the tenant. If the device cannot be authenticated/correlated, software operating on the device may interrupt operation and/or notify a user/administrator of the tenant network. After successful authentication/correlation, provisioning and other services may then be distributed to device 60 from portal server 30 based upon the software and services tailored for the particular device and tenant.

Figure 2:
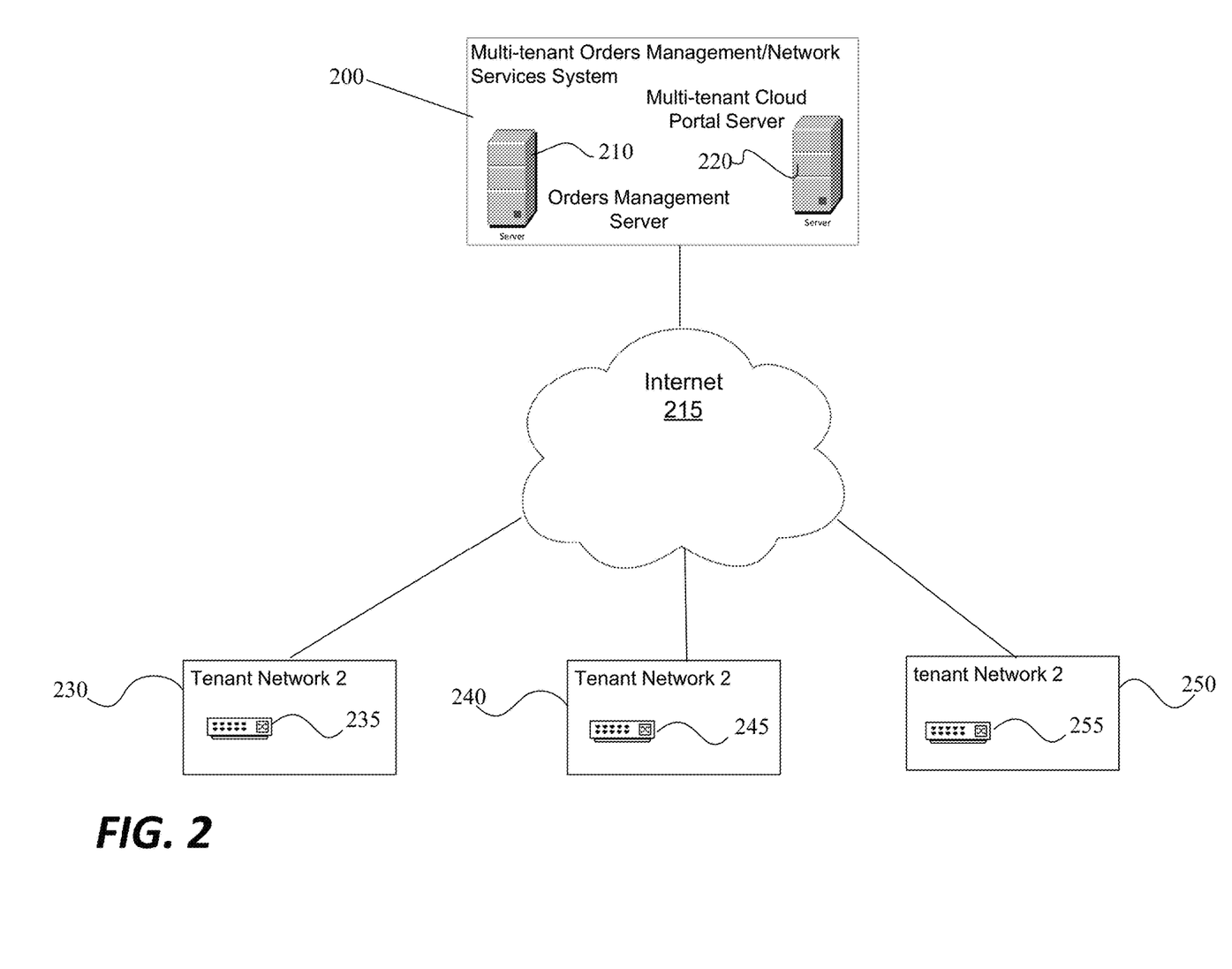
FIG. 2 shows an illustrative network topology of a system for distributing network services to a network device in accordance with some embodiments of the disclosure.

FIG. 2 shows an illustrative network topology of a system for distributing network services to a network device in accordance with some embodiments of the disclosure. A multi-tenant orders management/network services system 200 includes an orders management server 210 and a multi-tenant cloud portal server 220. System 200 services multiple tenants 230, 240, and 250 and associated devices 255, 245, and 255 via server 220 and internet 215. Each of the devices 235, 240, 255 may have been purchased/procured through orders management server 210 and assigned and programmed with a particular unique identification (e.g., a serial number) such during manufacture and/or initial programming. The identification parameter may be programmed, for example, in non-volatile memory (e.g., ROM/flash memory) of the device. When a device 235, 245, 255 is subsequently connected to system 200, software operating the device may identify the device to the server 220 using the unique identification parameter (e.g., by reading it from device memory).

Each of the devices 235, 245, and 255 may be associated with different tenants and services associated with and distributed by system 200. Once the particular device successfully identifies itself to system 200, the associated services may be distributed to the particular device. In some embodiments, a more diligent authentication process may be executed to further confirm the device as a particular original, authentic device (e.g., that was procured or tracked through orders management system 210). In some embodiments, the device may be integrated with a tamper-resistant trusted platform module (TPM) or ROM that is programmed with enhanced security features (e.g., encryption keys) to further ensure the device is original.

Embodiments of such security features are described, for example, in concurrently filed patent applications, the entire contents of which are herein incorporated by reference. In an embodiment, the device utilizes attestation protocols programmed in a TPM to verify/attest to the device's authenticity by utilizing encryption keys programmed into the TPM and/or device memory and confirming them with associated private keys maintained securely by the system 200. In another embodiment, the TPM is verified locally utilizing a TPM protocol to verify that the tamper-resistant TPM is programmed with an authentic attestation identity key (AKI) using a certificate which is installed with software operating the device.

Figure 3:
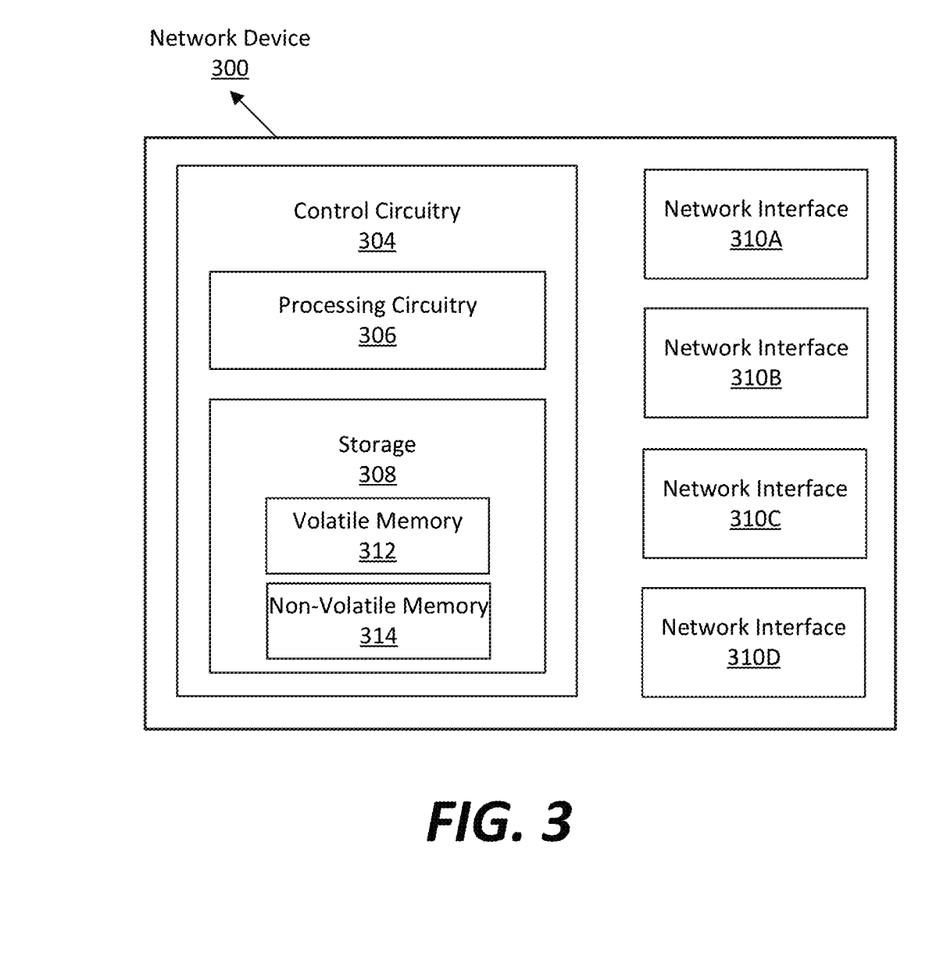
FIG. 3 shows a diagram of an illustrative network device in accordance with some embodiments of the disclosure.

FIG. 3 shows a diagram of an illustrative network device in accordance with some embodiments of the disclosure. Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for performing operational, communication, and provisioning functions in devices such as described in FIGS. 1 and 2. For example, control circuitry 304 may be integrated into network device 60 of FIG. 1 and network device 60 may process communications with orders management server 20 and multi-tenant cloud portal server 30 via network interface 310, store the device identification parameter discussed above in non-volatile memory 314 (e.g., USB Flash memory), and be programmed with instructions and parameters for performing processing described in FIGS. 4-6 in volatile memory 312 (e.g., RAM) and/or non-volatile memory 314.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard drives, optical drives, solid state devices, quantum storage devices, or any other suitable fixed or removable storage devices, and/or any combination of the same. The circuitry described herein may execute instructions included in software running on one or more general purpose or specialized processors. Multiple circuits may be provided to handle simultaneous processing functions. Further, other devices described herein (e.g., orders management server 20 and multi-tenant cloud portal server 30) may include the processing and storage components of device 300 and/or variations thereof.

Figure 4:
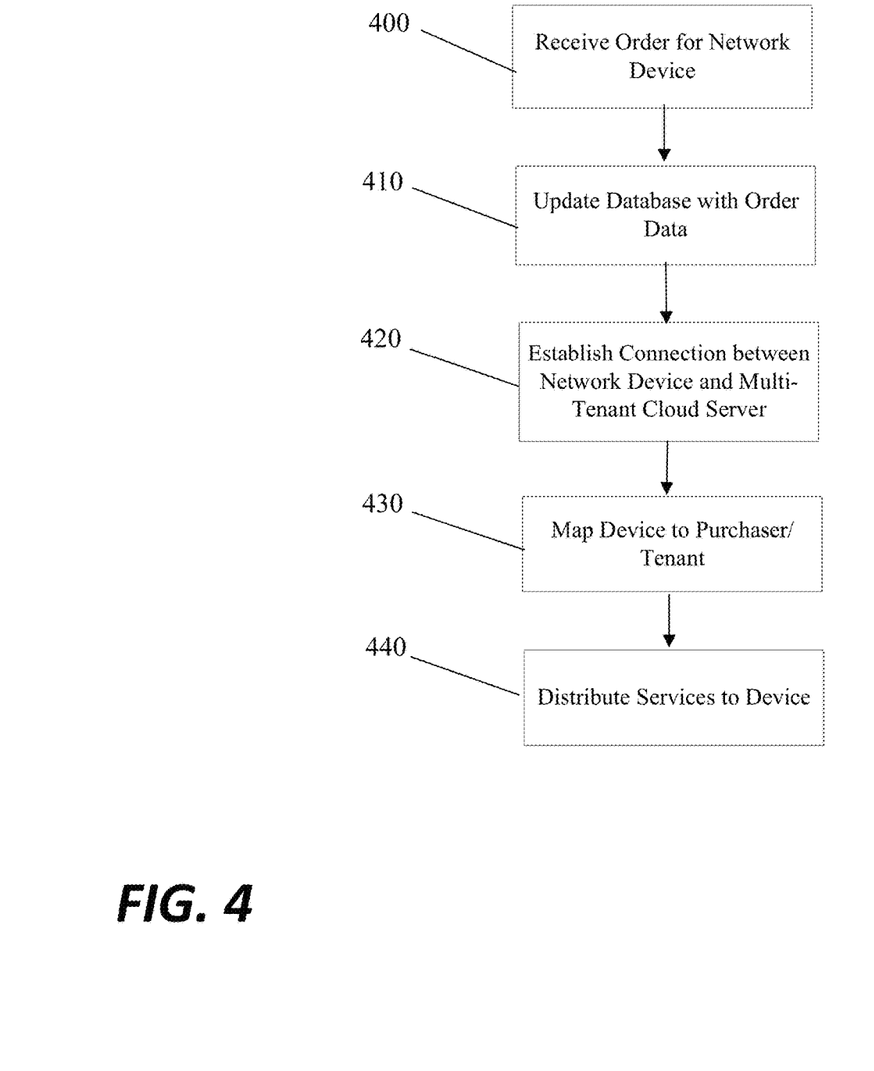
FIG. 4 is a flowchart of an illustrative process for configuring and distributing network services using a multi-tenant network services and orders management system in accordance with some embodiments of the disclosure.

FIG. 4 is a flowchart of an illustrative process for configuring and distributing network services in a multi-tenant network services and orders management system in accordance with some embodiments of the disclosure. At block 400, an order for a network device (e.g., network device 60) is received (e.g., at orders management server 20 of system 10). The ordered device may be associated with a particular device distributer trusted by the ordering entity (e.g., a purchaser/client/tenant). After receiving the order, a database (e.g., product/tenant database 15) is updated with the order information (e.g., purchaser/client/tenant) and a unique identification parameter (e.g., a device serial number). The unique parameter may be assigned in connection with manufacture and stored in non-volatile memory of the device (e.g., ROM/flash memory).

After an order is complete, the network device may be connected at block 420 to a multi-tenant system (e.g., multi-tenant orders management and network services system 10) associated with the device distributer. This may occur prior to distributing the device to a client/tenant such as for provisioning the device with particular software, configurations, and security programming. The network device may be identified and mapped with the client/tenant at block 430 by obtaining the unique parameter (e.g., serial number) directly from the device (e.g., by reading its memory) and looking up the ordering information previously stored in the database at block 410.

At block 420, the device may also connect to a remote multi-tenant system after it is deployed within a tenant network (e.g., client/tenant system 50) such as through the internet. At block 430, the device is identified and mapped with the tenant network by way of transmitting its identification parameter to the multi-tenant through its connection. The multi-tenant system may perform identification by accessing the database in which the identification parameter and tenant information was stored.

After identifying the device and mapping the device to a particular tenant, the multi-tenant system may distribute network services at block 440 to the network device based upon the identification. For example, the network device may be automatically provisioned with particular software and a configuration for operating the network device on the tenant's network. In some embodiments, the network device is a newly installed network switch and an automatic provisioning process (e.g., zero touch provisioning (ZTP)) may include first resetting the device to a default configuration, obtaining a topology of a LAN in which the switch is connected, installing updated and/or custom software on the device such as software that was purchased/selected by the tenant, and configuring the device with forwarding and security parameters previously established for the particular tenant and its network.

Other configurations and network services may also be provided through the multi-tenant system. For example, the multi-tenant system may provide virtual cloud data services purchased by the tenant, such as by automatically configuring the device to route particular data operations through a cloud server operated by the multi-tenant system. In some embodiments, a programmatic API is enabled in an EOS installed on the device. The API may be configured to allow calls by the multi-tenant system or other systems to configure and/or control the mapped network device remotely such as described herein. Examples of APIs include the EOS External API (eAPI) provided by Arista Networks, Inc.

In some embodiments, a particular tenant may utilize an Infrastructure as a Service (IaaS) system including a remotely managed cloud-based data center that can include multiple storage network elements dedicated for different network users, user groups, and with different levels of network security. The remote management server may include provisioning and configuring different network elements of the tenant's own network to seamlessly route and secure traffic to and from the cloud-based data center.

When the device is authenticated and mapped to a particular tenant in step 430, the multi-tenant cloud server may update the device with a network traffic forwarding configuration (e.g., by updating a forwarding table, flow table, ternary content-addressable memory) for routing particular traffic pursuant to the data center architecture and corresponding security levels. In some embodiments, the IaaS may configure a router (e.g., a gateway provider edge (PE) device) in the tenant network to operate a virtual private network (VPN) or virtual local area network (VLAN), for example.

In some embodiments, a VPN and/or VLAN may be implemented by managing a virtual LAN or ethernet virtual private network (EVPN) control plane and/or a layer 3 virtual private network (L3 VPN) control plane such as by configuring particular next hop (NH) identifiers and a multiprotocol label switching (MPLS) labels in the forwarding table of a router and/or switch mapped according to embodiments herein. In some embodiments, the multi-tenant system may configure the device to interface with a software driven cloud networking (SDN) overlay controller once the device is mapped. Some embodiments include configuring a controller, for example, through the CloudVision eXchange (CVX) by Arista Networks, Inc.

In some embodiments, the mapping performed at step 430 may include configuring the device to route Software as a Service (SaaS) cloud services to a client. These services can include web or other applications that, when called by the tenant, may be executed by a remote cloud server rather than on a tenant's device, for example. The device(s) mapped to the tenant can be configured to route such calls (e.g., at an application layer) to a cloud server administered by the multi-tenant system.

The multi-tenant system may provide SaaS services such as network management and monitoring. Based upon the mapping at step 430, the device may be configured to assist with collecting routing and traffic level data from the network device and other devices on the tenant's network. In some embodiments, the multi-tenant server may be used to reconfigure the network device(s) in the tenant's network in order to redistribute network processing workloads across the tenant's network and/or other connected networks automatically based upon the mapping and monitoring. The EOS® API and the Cloud Vision™ web portal provided by Arista Networks, Inc., for example, may be configured and programmed in some embodiments to perform automatic network monitoring and reconfiguration.

Figure 5:
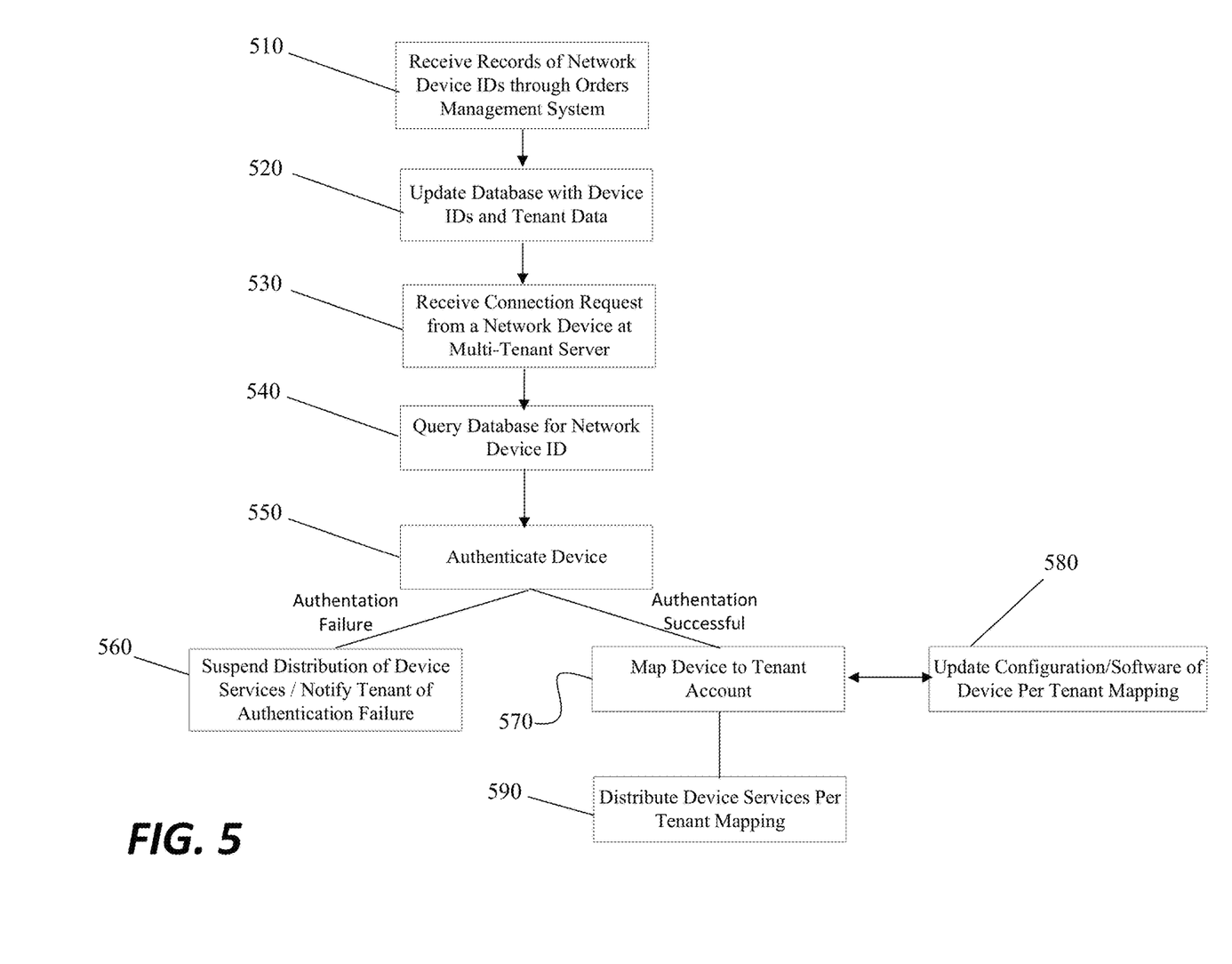
FIG. 5 is a flowchart of an illustrative process for configuring and distributing network services using a multi-tenant network services and orders management system in accordance with some embodiments of the disclosure.

FIG. 5 is a flowchart of an illustrative process for configuring and distributing network services in a multi-tenant network services and orders management system in accordance with some embodiments of the disclosure. A purchase of a network device is processed which generates information relating to the purchased device including an identification parameter and a client/tenant (e.g., which purchased the device) linked to the device. At block 510, this information is received at an orders management system (e.g., at orders management server 10) and, at block 520, stored in a record of a database system (e.g., in a record of database 15).

At block 530, a request is received from a network device to connect with a multi-tenant system. The request may comprise a network transmission across the internet received at a system such as the multi-tenant ordering/network services system 200 of FIG. 2. The device may identify itself in the connection request using an identification parameter (which may be a serial number stored in device memory as previously described). At block 540, the multi-tenant system queries the database system for the identification parameter received from the network device.

At block 550, the multi-tenant system uses the identification parameter to confirm the device's authenticity. For example, if the database system cannot find a record of the network device with the transmitted identification parameter, the multi-tenant system will not confirm the device as authentic. Other authentication steps may be performed, including the use of PKI and/or a TPM in the device as further described and referenced herein. If the network device cannot be authenticated at block 550, the software operating on the device and/or the multi-tenant system may notify the sender/requester at block 560 of the authentication failure. For example, a network administrator of the tenant's network with which the device claims to be associated with may be alerted to the device's authentication failure (e.g., via a display message, email message). Other measures may also be performed including a cessation/suspension of operation of the device by the device's software and/or blocking access to network services provided by the multi-tenant system.

If the device is authenticated, the device is mapped at block 570 to a particular product model, tenant, and/or mapped to associated network services within the multi-tenant system. As described herein, the multi-tenant system may utilize the authenticated identification parameter of the device and records in the database system to perform the mapping. In some embodiments, after the device is connected, authenticated, and mapped, the device may be automatically updated (e.g., ZTP) at block 580 with particular software and/or configurations relating to the particular device and/or tenant.

At block 590, after authentication, mapping, and updating (if needed), network services provided by the multi-tenant system are distributed to the device. As further described herein, the services may include network monitoring and management services, virtualized data cloud services, and other network services tailored to the identified device and/or associated tenant of the multi-tenant system.

Figure 6:
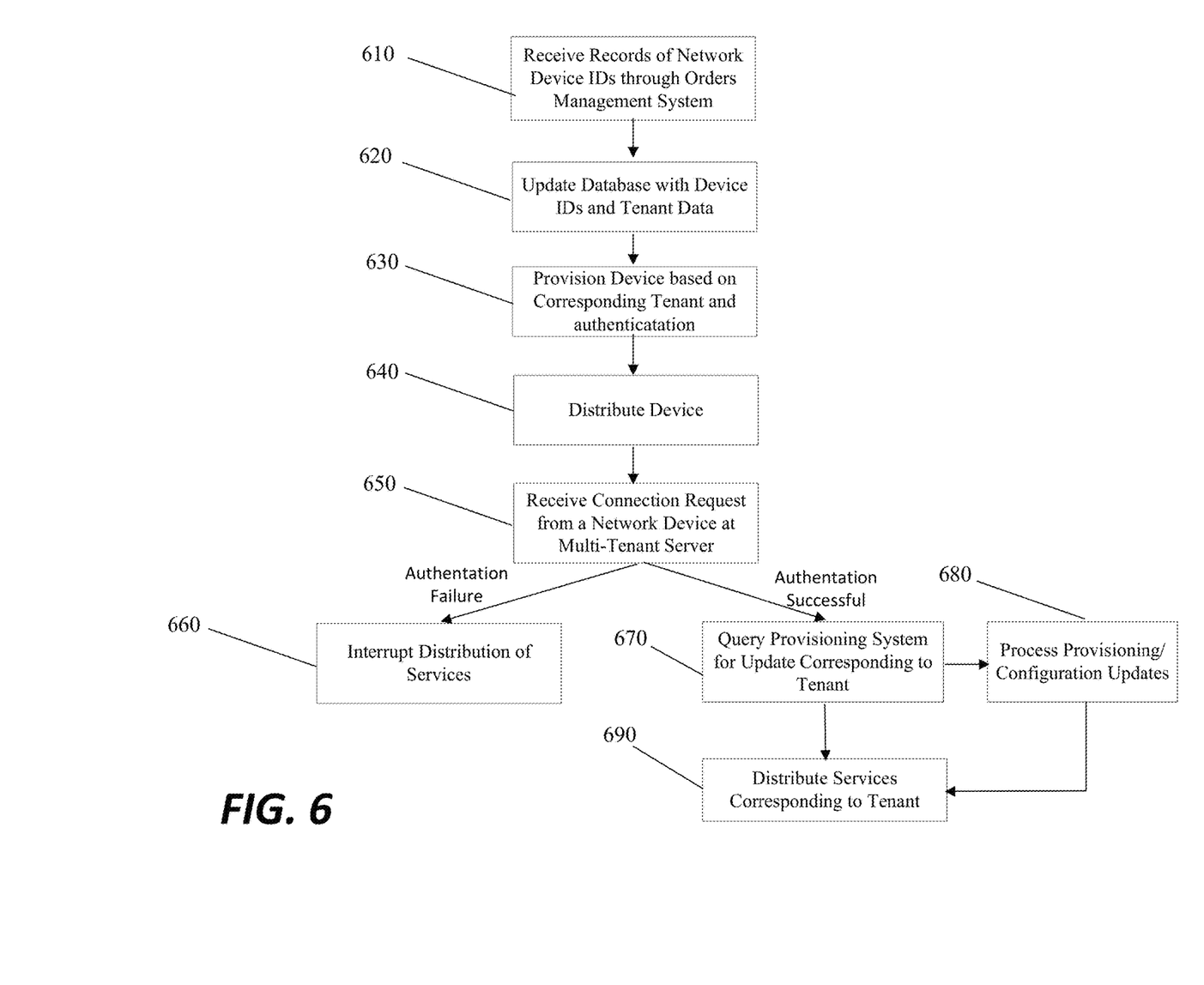
FIG. 6 is a flowchart of an illustrative process for configuring and distributing network services using a multi-tenant network services and orders management system in accordance with some embodiments of the disclosure.

FIG. 6 is a flowchart of an illustrative process for configuring and distributing network services in a multi-tenant network services and orders management system (e.g., system 200 of FIG. 2) in accordance with some embodiments of the disclosure. At block 610, an orders management server (e.g., orders management server 210 of FIG. 2) receives purchase orders for network devices. At block 620, the network management system tracks these orders and interfaces with a database system that maintains records of the network devices and their respective identification parameters assigned for distribution. The database system may also track which tenants within a multi-tenant system (e.g., multi-tenant system 200) the devices correspond to.

At block 630, prior to distribution of the device to a tenant, the network device may first be directly interfaced with a multi-tenant network services system. The device may be provisioned with software and/or configuration parameters associated with the corresponding tenant. For example, the particular identification parameter assigned to the device may be programmed within device memory (e.g., ROM) and later used when the device attempts to connect with a multi-tenant system. A TPM may also be manufactured and/or programmed with particular authentication features and parameters for use with the device.

The software installed on the device may be programmed to initialize the device upon startup and attempt to connect with and be authenticated by the multi-tenant network service system prior to normal operation. Further, the device may be configured with enhanced security features including, for example, programming the device with a signed encryption certificate including the device's identification parameter and a public key. The multi-tenant system and/or software operating on the device may later be utilized to authenticate the device (e.g., by validating the pre-programmed encryption certificate).

At block 640, the device is distributed to and deployed by the tenant. In some embodiments, the device may be integrated in a tenant network. In some embodiments, a purchaser/tenant may isolate the device from its own tenant network until it is successfully authenticated. Isolation may include physical isolation such that it is limited to an internet connection for purposes of connecting with the multi-tenant network. The device and/or multi-tenant network may then perform authentication steps and initial provisioning/configuring prior to being further connected within the tenant's network.

For example, at block 650, the device may attempt to connect with the multi-tenant system and request authentication upon initial startup. Authentication may include verifying the identification parameter (e.g., serial number) programmed into the device and performing other security measures such as described herein. At block 660, if the device cannot be authenticated, the software operating on the device and/or a multi-tenant network services system may notify the tenant network (e.g., via an administrator) of the failure. In some embodiments, the device may be prevented from operating normally and/or the multi-tenant system may suspend distribution of network services to the device.

At block 670, if the device is successfully authenticated, the multi-tenant system may determine whether the device needs further updating (e.g., with new software parameters) such as those particular to a tenant/purchaser. In some embodiments, a tenant can be mapped to the device using the database system that tracks device identification parameters and associated tenants. If the device needs updating, the device may be updated at block 680 prior to normal operation.

After authenticating and updating the device (if needed), the device may be permitted to operate normally within a tenant network. Further, in some embodiments, a multi-tenant network services system may then distribute network services to the network device at block 690. In some embodiments, these services may be distributed based upon a mapping of the device to a particular tenant in the multi-tenant system as described in various embodiments herein.

The processes described above, including processes 400, 500, and 600, are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method for distributing network services for a network device, the method comprising:
    establishing a network connection between a purchased network device and a multi-tenant network service;
    in response to establishing the network connection, obtaining, at a server of the multi-tenant network service, a device-associated identification parameter from the purchased network device;
    using the identification parameter to query a database for at least one record associated with the purchased network device, wherein the at least one record was created or updated in response to the purchase of the device through an orders management system and the at least one record was created or updated with the device-associated identification parameter and an identification of a tenant of the multi-tenant network service wherein the tenant corresponds to the device;
    mapping the purchased network device to the identified tenant of the multi-tenant network service; and
    distributing network services of the multi-tenant network service based upon the mapping of the purchased network device to the identified tenant.

2. The method of claim 1 wherein the identification parameter is a unique serial number of the device.

3. The method of claim 1 wherein the multi-tenant network service comprises virtualized cloud data center services.

4. The method of claim 1 wherein the network services comprise at least one of network management services, data network device provisioning services, network monitoring services, network workload distribution services, physical-to-virtual mapping services, hypervisor services, and open source controller services.

5. The method of claim 1 wherein the network services comprise network API services tailored to the identified tenant.

6. The method of claim 1 wherein the at least one record was automatically generated in response to a purchase order associated with the purchased network device and associated with the identified tenant.

7. The method of claim 6 wherein the network services comprise device provisioning services that are provided based upon the purchase order and prior to delivery of the device to the identified tenant.

8. The method of claim 1 wherein the at least one record is associated with the purchased network device and a tenant account of the identified tenant mapped within the multi-tenant network service.

9. The method of claim 8 wherein distributing the distributed network services corresponds to a plurality of products or services associated with the tenant account.

10. A system for distributing network services for a network device, the system comprising:
    a database system configured to manage and track records of network devices and identification parameters corresponding to the network devices;
    a multi-tenant network server configured to:
        establish a connection with a purchased network device;
        receive an identification parameter from the purchased network device;
        query the database system for at least one record identifying the purchased network device by the received identification parameter;
        based upon identifying the network device, mapping the purchased network device to a tenant of the multi-tenant network server; and
        distributing network services to the purchased network device based upon the mapping of the network device to the tenant; and
    an orders management system server configured to process network device purchase orders, wherein processing the orders includes causing the database system to create or update records of the purchased network device with a corresponding network device identification parameter together with a corresponding tenant of the multi-tenant network server.

11. The system of claim 10 wherein the identification parameter is a unique serial number of the device.

12. The system of claim 10 wherein the network services comprise virtualized cloud data center services.

13. The system of claim 10 wherein the network services comprise at least one of network management services, data network device provisioning services, network monitoring services, network workload distribution services, physical-to-virtual mapping services, hypervisor services, and open source controller services.

14. The system of claim 10 wherein the network services comprise network API services tailored to the identified tenant.

15. The system of claim 10 wherein the at least one record was automatically generated in response to a purchase order associated with the purchased network device and associated with the identified tenant.

16. The system of claim 15 wherein the network services comprise device provisioning services that are provided based upon the purchase order and prior to delivery of the device to the identified tenant.

17. The system of claim 10 wherein the at least one record is associated with the purchased network device and a tenant account of the identified tenant within the multi-tenant network service.

18. The system of claim 17 wherein the distributing of the distributed network services corresponds to a plurality of products or services associated with the tenant account.

19. One or more non-transitory computer-readable media storing instructions, which when executed by one or more processors cause:
    establishing a network connection between a purchased network device and a multi-tenant network service;
    in response to establishing the network connection, obtaining, at a server of the multi-tenant network service, a device-associated identification parameter from the purchased network device;
    using the identification parameter to query a database for at least one record associated with the purchased network device, wherein the at least one record was created or updated in response to the purchase of the device through an orders management system and the at least one record was created or updated with the device-associated identification parameter and an identification of a tenant of the multi-tenant network service wherein the tenant corresponds to the device;

mapping the purchased network device to the identified tenant of the multi-tenant network service; and distributing network services of the multi-tenant network service based upon the mapping of the purchased network device to the identified tenant.

20. The one or more non-transitory computer-readable media of claim 19 wherein the identification parameter is a unique serial number of the device.

21. The one or more non-transitory computer-readable media of claim 19 wherein the multi-tenant network service comprises virtualized cloud data center services.

22. The one or more non-transitory computer-readable media of claim 19 wherein the network services comprise at least one of network management services, data network device provisioning services, network monitoring services, network workload distribution services, physical-to-virtual mapping services, hypervisor services, and open source controller services.

23. The one or more non-transitory computer-readable media of claim 19 wherein the network services comprise network API services tailored to the identified tenant.

24. The one or more non-transitory computer-readable media of claim 19 wherein the at least one record was automatically generated in response to a purchase order associated with the purchased network device and associated with the identified tenant.

25. The one or more non-transitory computer-readable media of claim 24 wherein the network services comprise device provisioning services that are provided based upon the purchase order and prior to delivery of the device to the identified tenant.

26. The one or more non-transitory computer-readable media of claim 19 wherein the at least one record is associated with the purchased network device and a tenant account of the identified tenant mapped within the multi-tenant network service.

27. The one or more non-transitory computer-readable media of claim 26 wherein distributing the distributed network services corresponds to a plurality of products or services associated with the tenant account.

\* \* \* \* \*